US007159845B2

(12) United States Patent
Lyko et al.

(10) Patent No.: US 7,159,845 B2
(45) Date of Patent: Jan. 9, 2007

(54) BEARING MODULE FOR AN EXHAUST GAS RECIRCULATION VALVE

(75) Inventors: Bohdan M. Lyko, Macedon, NY (US); Joseph G. Spakowski, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 111 days.

(21) Appl. No.: 10/956,456

(22) Filed: Oct. 1, 2004

(65) Prior Publication Data

US 2006/0071191 A1 Apr. 6, 2006

(51) Int. Cl.
*F16K 31/44* (2006.01)

(52) U.S. Cl. .................. 251/214; 251/213; 123/568.21

(58) Field of Classification Search ................. 251/88, 251/129.11, 129.15, 323, 330, 367, 369, 214, 251/213; 123/568.11, 568.22, 568.23, 568.24, 123/568.26, 90.37, 188.6, 190.17, 568.21; 137/248; 277/618, 554, 557, 390; 384/28, 384/94, 130, 416, 607

See application file for complete search history.

(56) References Cited

U.S. PATENT DOCUMENTS

| | | | | |
|---|---|---|---|---|
| 3,565,496 | A * | 2/1971 | Latussek | 384/219 |
| 6,497,226 | B1 * | 12/2002 | Bircann et al. | 123/568.11 |
| 6,543,746 | B1 | 4/2003 | Bircann et al. | |
| 6,634,346 | B1 | 10/2003 | Bircann et al. | |

* cited by examiner

*Primary Examiner*—Justine Yu
(74) *Attorney, Agent, or Firm*—Paul L. Marshall

(57) ABSTRACT

A bearing module for a pintle valve including a pintle bearing, bearing spring, and two-part housing. The bearing has an axial face for sealing against an inner axial surface of the housing. The bearing diameter is less than the diameter of the housing, permitting the bearing to float radially. The housing fits into a port in the valve body and also extends over an axial surface of the body, thus forming a seal against the wall of the port and the surface of the body. The bearing spring, preferably a wave washer, is compressed within the housing as the two housing parts are assembled to form the module. In a currently preferred embodiment, the housing further comprises a coking shield extending along the surface of the pintle shaft within the valve port to reduce the tendency for coking gases to enter the bearing module.

10 Claims, 3 Drawing Sheets

BEARING MODULE FOR AN EXHAUST GAS RECIRCULATION VALVE

TECHNICAL FIELD

The present invention relates to pintle-type valves; more particularly, to such a valve for permitting the controlled admission of exhaust gases into the fuel intake manifold of an internal combustion engine; and most particularly, to a bearing module incorporating a pintle bearing, bearing retaining spring, and housing to reduce tolerance requirements of the valve bore and pintle shaft alignment and to provide improved sealing against leakage of exhaust gases.

BACKGROUND OF THE INVENTION

It is well known in the automotive art to provide a variable valve connecting the exhaust manifold with the intake manifold of an internal combustion engine to permit selective and controlled recirculation of a portion of an engine's exhaust gas into the fuel intake stream. Such recirculation is beneficial for reducing the burn temperature of the fuel mix in the engine to reduce formation of nitrogen and sulfur oxides which are significant components of smog. Such a valve is known in the art as an exhaust gas recirculation (EGR) valve. Typically, an EGR valve has a valve body enclosing a chamber disposed between a first port in the exhaust manifold and a second port in the intake manifold; a valve seat dividing the chamber between the two ports; a pintle valve having a valve head fitted to the valve seat and a valve stem or pintle extending from the valve head through a bearing mounted in a third port in a sidewall of the valve body; and an actuator, such as a linear-acting solenoid, mounted on the exterior of the valve body and operationally connected to the outer end of the valve stem. Because exhaust gas may leak along the valve stem, a prior art actuator typically is mounted on standoffs to vent such leaking exhaust gas and thereby prevent it from entering and corroding the solenoid.

The bearing has a circumferential flange for sealing against an outer surface of the valve body and may be urged to seal by a spring which is compressed and captured between the valve body and the actuator, such as a compressed coil spring surrounding the valve stem.

An EGR valve having such a standoff configuration may be exposed to various contaminants, such as mud and salt from roadways, which can corrode the exposed valve stem and spring or accumulate on the bearing, eventually fouling the stem and disabling the valve. Therefore, a cup-shaped bearing splash shield extending axially over the spring and bearing typically is provided to protect the bearing, stem, and spring from external contamination.

During assembly of such a prior art valve, after the valve head is inserted into the chamber via the third port, the bearing is slipped onto the pintle and seated against the valve body, then the spring is installed onto the pintle, then the splash shield is installed over the spring, and then the actuator pole piece is attached to the outer end of the pintle and the actuator is bolted to the valve body through a plurality of hollow standoffs, thus capturing the spring against the underside of the shield and compressing the spring to the proper degree. This procedure requires manual alignment of the various parts, which are loose and which must be mutually aligned for proper assembly; thus, the valve is easily subject to misassembly.

In U.S. Pat. No. 6,634,346, issued Oct. 21, 2003 to Bircann et al., the relevant disclosure of which is herein incorporated by reference, a bearing module is disclosed comprising a pintle bearing, bearing retaining spring, and bearing splash shield for use in an exhaust gas recirculation valve for an internal combustion engine. The bearing is provided with a circumferential flange for sealing with an outer surface of the valve body, and with an annular step for receiving the rolled or crimped skirt of the bearing splash shield. The bearing retaining spring surrounding the valve pintle is compressed and captured within the splash shield as the skirt is formed onto the annular step to form the module. The axial length of the module between the outer end of the shield and the axial face of the bearing flange is slightly greater than the assembled distance between the valve body and the actuator of the EGR valve, such that the spring is further compressed by installation of the actuator onto the valve body to urge the first circumferential bearing face sealingly against the valve body. Advantageously, the prior art bearing module may be pre-assembled offline by known methods to reduce complexity during assembly of the valve.

A portion of the bearing extends into a valve port for the pintle shaft to center the bearing module within the port. In a preferred embodiment of the prior art bearing module, the diameter of the portion of the bearing extending into the valve port is slightly less than the diameter of the port to permit the bearing to shift, or "float", radially as may be required for the valve head to seat conformably in the seat.

Because the bearing portion extending into the valve port is loose-fitting therein, the seal against leakage between the bearing and the valve body occurs solely at the dynamic interface between the bearing flange and the valve body outer surface. A drawback of the prior art module is that this seal requires a high quality surface on both the valve and the bearing flange, thus adding to the overall manufacturing cost of the valve.

What is needed is a modular assembly of a bearing, spring, and shield which is readily pre-assembled offline, wherein the bearing may be self-aligned by the pintle without resulting in a leak path along the wall of the valve port.

SUMMARY OF THE INVENTION

The present invention is directed to a bearing module comprising a pintle bearing, bearing spring, and two-part housing for an exhaust gas recirculation valve for an internal combustion engine. The bearing is provided with an axial face for sealing against an inner axial surface of the housing. The bearing diameter is less than the inner diameter of the housing, permitting the bearing to float radially within the housing. The housing is full-fitting in a port in the valve body and also extends over an axial surface of the valve body, thus forming a seal against both the wall of the port and the surface of the body. The bearing spring, preferably a wave washer, is compressed and captured within the housing as the two housing parts are assembled to form the module. In a currently preferred embodiment, the housing further comprises a coking shield that extends along the surface of the pintle shaft within the valve port to reduce the tendency for coking gases to impinge and collect on the pintle shaft.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
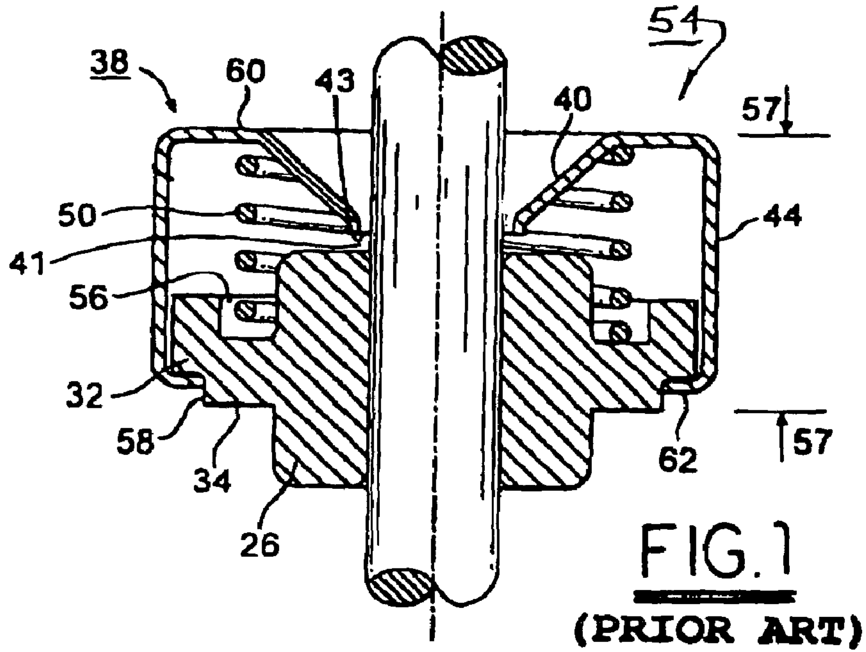
FIG. 1 (PRIOR ART)
FIG. 1 is an elevational cross-sectional view of a prior art modular bearing assembly substantially as disclosed in U.S. Pat. No. 6,634,346.
Figure 2:
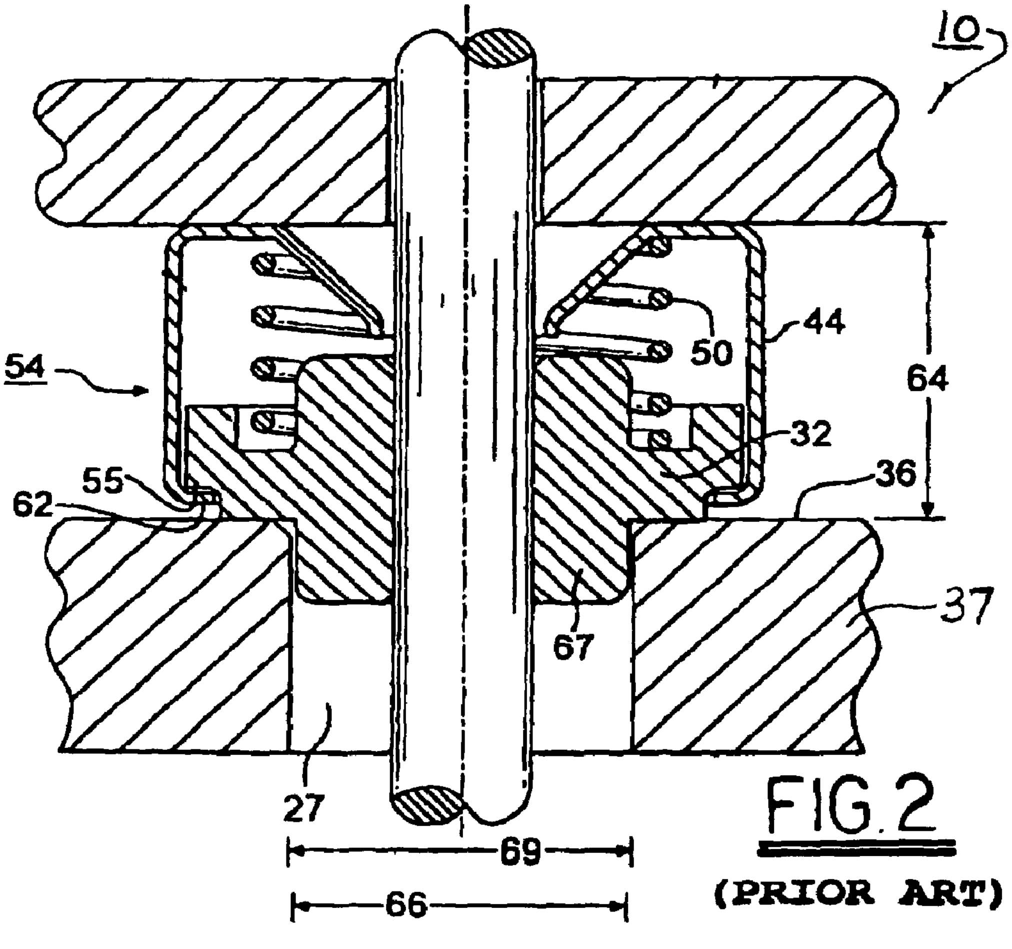
FIG. 2 (PRIOR ART)
FIG. 2 is an elevational cross-sectional view showing the prior art bearing assembly as a component of a prior art pintle valve assembly.

The benefits afforded by the present invention will become more readily apparent by first considering a prior art bearing module and pintle valve. Referring to FIGS. 1 and 2, a prior art valve 10 includes a bearing module 54. Bearing 26 includes an annular step 58 in flange 32, and also preferably an annular well 56 in flange 32 for more positive seating and centering of spring 50. Housing 44 includes splash shield 38. Flange 40 is formed such that an axial clearance 41 exists between the inner edge 43 of flange 40 and bearing 26.

The diameter 66 of the portion 67 of bearing 26 extending into port 27 is slightly less than the diameter 69 of port 27 to permit the bearing to float radially in port 27 as may be required for the valve head (not shown) to seat conformably in the valve seat (not shown).

To pre-assemble module 54, bearing 26, spring 50, and housing 44 are positioned in a conventional jig, wherein spring 50 is compressed and the axial length 57 of module 54 between face 34 and upper surface 60 of shield 38 is established. The free edge 62 of housing 44 is then rolled or staked radially inwards into step 58 and against axial face 55 to lock the module components together. After removal from the jig, the module is ready for assembly into valve 10.

As noted above, a shortcoming of prior art bearing module 54 is that the seal against leakage from port 27 is formed by a dynamic interface between bearing surface 34 and valve surface 36 of valve body 37, requiring very high planarity mating surfaces. Further, the length 57 of the relaxed module 54 is slightly less than the installed distance 64 between valve surface 36 and actuator. During installation of bearing module 54 into valve 10, axial face 55 is lifted off of free edge 62, such that the compressed force of spring 50 is brought to bear in urging bearing surface 34 against valve surface 36. However, spring 50 is of limited strength and diameter, being installed within housing 44. Because bearing portion 67 is allowed to float radially in port 27, no additional sealing may be provided along the surface of port 27. Indeed, no static sealing is possible against leakage from port 27.

What is needed in the art is a bearing module wherein the installation of the bearing module into the valve acts to statically seal both the port surface and the valve body surface against leakage while still permitting the bearing to float radially as in the prior art.

Figure 3:
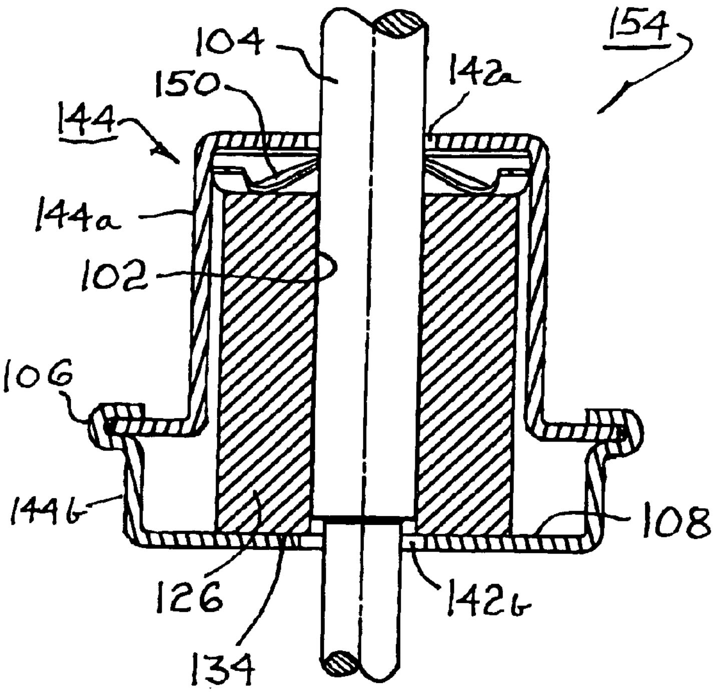
FIG. 3 is an elevational cross-sectional view of a first embodiment of a bearing module in accordance with the invention.
Figure 5:
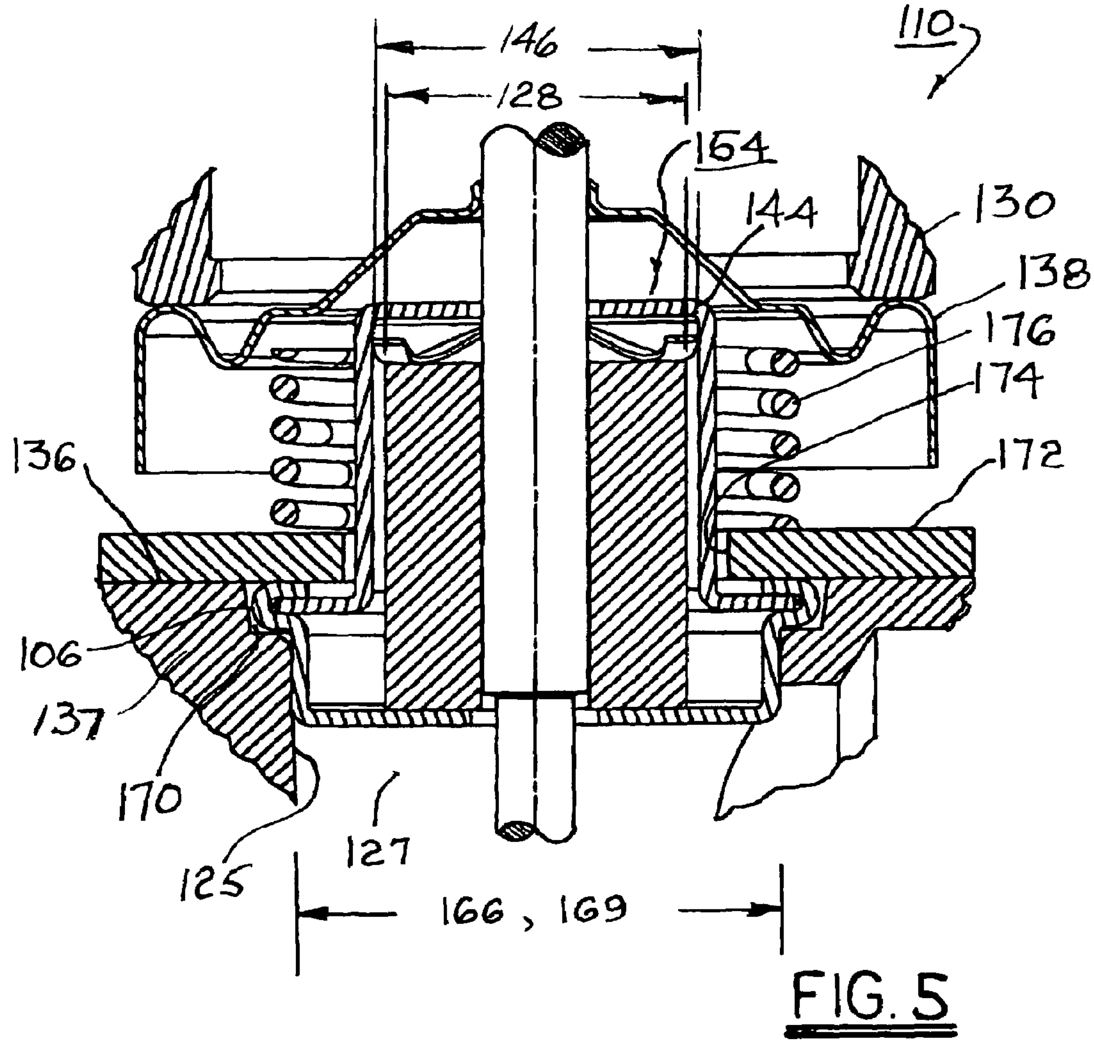
FIG. 5 is an elevational cross-sectional view showing the bearing module shown in FIG. 3 installed in a pintle valve.

Referring to FIGS. 3 and 5, a first embodiment 154 of an improved bearing assembly module in accordance with the invention includes a cylindrical bearing 126 having a close-fitting axial bore 102 for slidably receiving a pintle shaft 104 of a poppet valve 110. Bearing 126 is preferably formed of a self-lubricating material such as bronze or other known metal alloys or rigid polymeric plastics such as polyimides or polyamides. A housing 144 comprising a first shell **144*a* and a second shell 144*b* surrounds bearing 126. Preferably the first and second shells are joined, as by a conventional annular crimp joint 106, during assembly to capture bearing 126 therewithin. The outer diameter 128 of bearing 126 is less than the inner diameter 146 of housing 144 such that bearing 126 is free to move radially within housing 144**.

Each of housing shells **144*a*, 144*b* respectively has a central opening 142*a*, 142*b* having a diameter greater than that of shaft 104 at that point such that shaft 104** is not radially constrained by the housing during use.

The axial length of bearing 126 and the internal axial space within housing 144 are selected such that, when module 154 is assembled with a properly selected wave spring washer 150, the wave washer is axially compressed to provide a predetermined spring force urging bearing surface 134 into sealing relationship against housing surface 108. The spring force is fixed during assembly of module 154 and is neither enhanced or diminished during installation, unlike prior art module 10. Although it is under fixed and predetermined compression, bearing 126 is free to float radially along surface 108 as may be required in use as dictated by shaft 104 for the valve head to mate correctly into the valve seat.

Second housing shell **144*b* has an outer diameter 166 substantially identical with the diameter 169 of port 127 in valve 110 such that shell 144*b* forms a gas seal along the interface with the wall 125 of port 127. Preferably, an annular recess 170 is formed in body 137 of valve 110 at the intersection of wall 125 and surface 136 for receiving crimp joint 106 during assembly of valve 110. A retainer plate 172 having a central opening 174 is installed over module 154, plate 172 capturing joint 106 within recess 170. Plate 172 in turn receives a compression sealing spring 176 surrounding housing 144 which is compressively captured by splash shield 138 and actuator 130 during final assembly of valve 110. Thus, spring 176 provides sealing force against leaks along the static interfaces between plate 172 and valve surface 136, between plate 172 and crimp joint 106, and between crimp joint 106 and recess 170. Shaft 104 and bearing 126 are free to float radially as may be required within housing 144 while housing 144 and plate 172 effectively prevent leakage from port 127. Further, the redundancy of static seals and the compressive strength of spring 176 reduces the quality requirements, and hence the manufacturing cost, and improves the reliability, of valve 110**.

Figure 4:
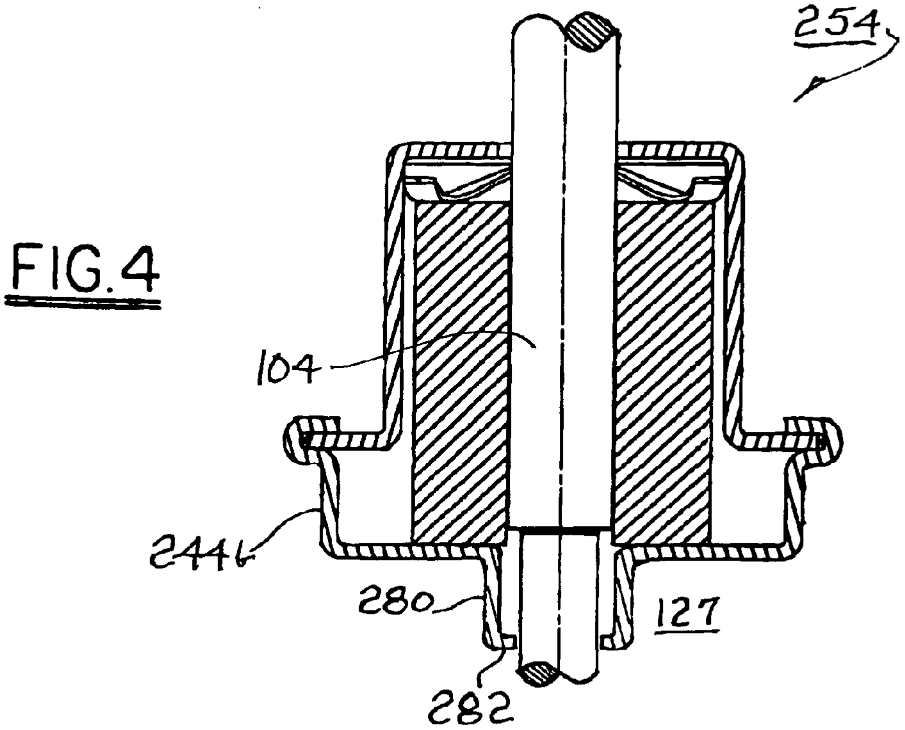
FIG. 4 is an elevational cross-sectional view of a second embodiment of a bearing module in accordance with the invention.

Referring to FIG. 4, in a second embodiment 254 of a bearing module in accordance with the invention, all elements are substantially identical with corresponding elements in first embodiment 154 except that second housing shell **244*b* is provided with an anti-coking snout 280 extending axially along the surface of shaft 104 into port 127. Preferably, snout 280 includes a partially closed end 282 extending into close proximity to shaft 104 sufficient to minimize passage of coking gases into module 254 and impingement of coking gases on shaft 104 while still allowing any required radial motion of shaft 104**.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A bearing module for use in a pintle valve having a valve body and a valve pintle shaft extending from the valve body, the module comprising:

a) a housing including an inner axial surface, and having first and second axial openings for receiving said pintle shaft, said housing having an inner diameter;

b) a bearing disposed in said housing and having an axial bore for receiving said pintle, said bearing having an outer diameter less than said inner diameter of said housing to form a gap therebetween such that said bearing can move radially within said gap, said bearing having an axial surface for sealingly and slidably mating with said inner axial surface of said housing; and c) a spring disposed against said housing and extending between said bearing and said housing for urging said bearing against said inner axial surface of said housing.

2. A bearing module in accordance with claim 1 wherein said spring is a wave washer.

3. A bearing module in accordance with claim 1 wherein said housing comprises a first shell and a second shell joinable to said first shell to compressively capture said bearing and said spring therewithin.

4. A bearing module in accordance with claim 3 wherein said first shell and said second shell are joined by an annular crimp joint.

5. A bearing module in accordance with claim 1 wherein said bearing is formed of material selected from the group consisting of bronze, metal alloys, polymeric plastics, and combinations thereof.

6. A bearing module in accordance with claim 1 further comprising an anti-coking snout extending axially away from said housing adjacent said shaft.

7. An exhaust gas recirculation valve for use in an internal combustion engine, said valve having a valve body and a valve pintle shaft extending from said valve body to a shaft actuator, said valve comprising:

a) a port for entering said pintle shaft into said valve body; and b) a bearing module disposed in said port for supporting said shaft in said port, said module including a housing having an inner axial surface, and having first and second axial openings for receiving said pintle shaft, said housing having an inner diameter, a bearing disposed in said housing and having an axial bore for receiving said pintle shaft, said bearing having an outer diameter less than said inner diameter of said housing to form a gap therebetween such that said bearing can move radially within said gap, said bearing having an axial surface for sealingly and slidably mating with said inner axial surface of said housing, and a spring disposed against said housing and extending between said bearing and said housing for urging said bearing against said inner axial surface of said housing.

8. A valve in accordance with claim 7 wherein said housing is sealingly fitted into said port.

9. A valve in accordance with claim 7 wherein said valve housing includes an annular crimp joint and wherein said valve body includes an annular recess for receiving said annular crimp joint.

10. A valve in accordance with claim 9 wherein said valve further comprises a retainer plate for retaining said bearing module in said valve body port.

* * * * *